UNITED STATES PATENT OFFICE.

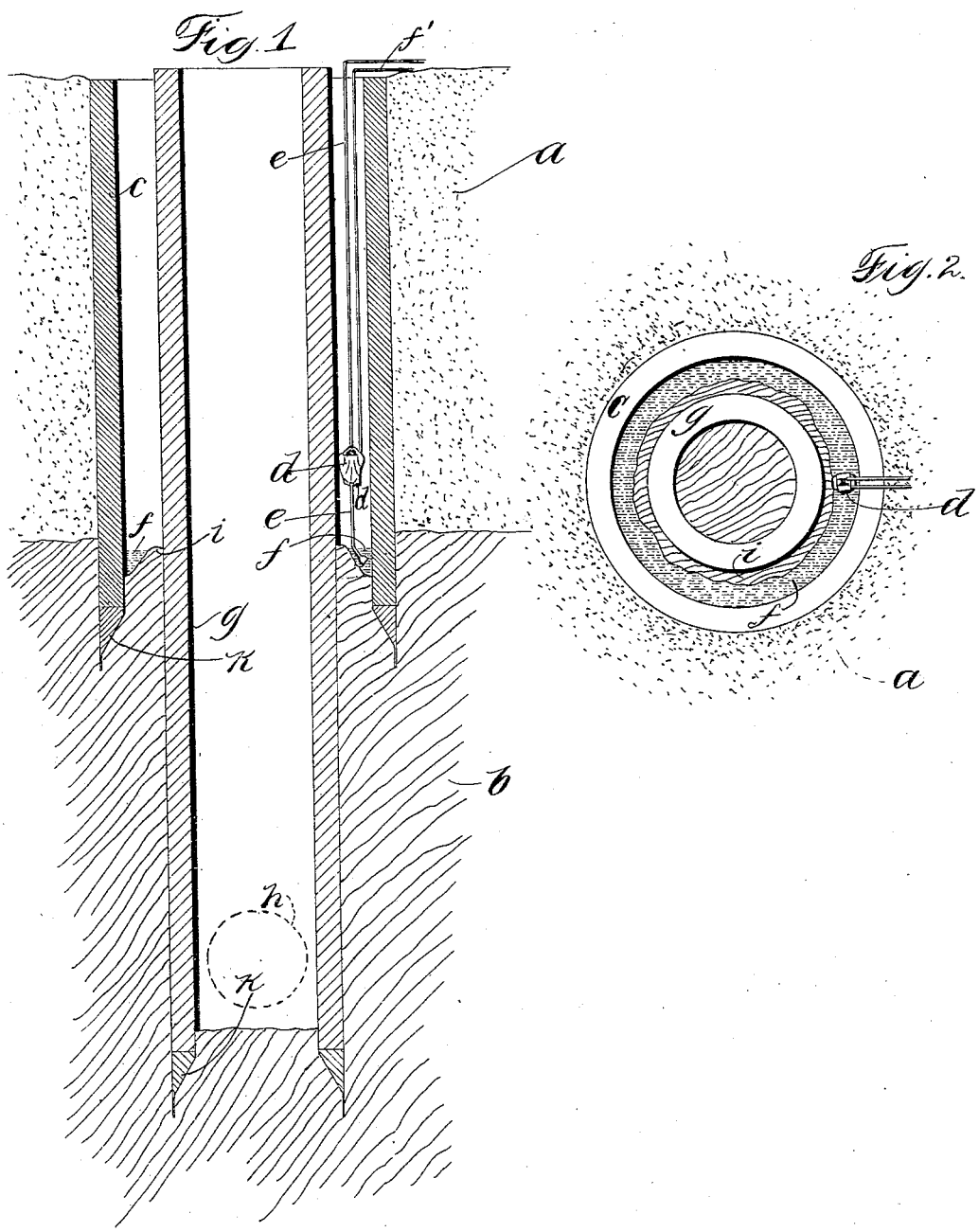

GEORGE R. MOORE, OF CHICAGO, ILLINOIS.

SHAFT.

941,087.  Specification of Letters Patent.  Patented Nov. 23, 1909.

Application filed November 30, 1907. Serial No. 404,587.

*To all whom it may concern:*

Be it known that I, GEORGE R. MOORE, a citizen of the United States, residing at Chicago, in the county of Cook and State of Illinois, have invented a certain new and useful Improvement in Shafts, of which the following is a full, clear, concise, and exact description, reference being had to the accompanying drawings, forming a part of this specification.

My invention relates to shafts.

Hitherto difficulty has been experienced in sinking shafts through water bearing soil, due to the fact that the water is likely to sipe between the soil and the shaft, thereby gaining access to the interior of the shaft through its bottom, which should be kept free of water for reasons that are apparent.

I overcome the difficulty in sinking shafts through water bearing soil by first sinking a supplemental shaft which constitutes a shield, and into which the water may sipe or ooze through its bottom. After this supplemental shaft has been sunk to the desired depth, the main shaft is sunk through the bore of the supplemental shaft, sufficient space intervening between the two shafts to afford a trap for the water that has siped or oozed into the supplemental shaft, from which trap the water may be forced, in order to prevent it from siping between the soil and the inner or main shaft. A gutter is desirably formed in the soil that intervenes between the two shafts, a bank being provided for the gutter adjacent to the inner or main shaft, so that the water may well be confined by the pumping mechanism to a level below this bank or rim, so that no opportunity is afforded for the sipage of water between the soil and the main shaft. I employ the gutter in the event of the inability of the pumping mechanism to keep the space between the two shafts entirely free of water.

I will explain my invention more fully by reference to the accompanying drawing, which shows my invention as it is preferably practiced.

In the drawing Figure 1 is a vertical sectional view taken on the diameter of the shaft. Fig. 2 is a plan view of the organization shown in Fig. 1.

Like parts are indicated by similar characters of reference in both figures.

The invention has been shown as being employed in connection with a light water bearing soil, such as sand, indicated at $a$, and a heavy non-water bearing soil, such as clay, indicated at $b$. A supplemental shaft $c$, formed of any suitable material and made of any suitable shape, is sunk through the water bearing soil and a suitable distance into the heavy or clay soil $b$, the water bearing soil, of course, being removed from the interior of this shaft $c$. As hitherto, the water is liable to pass from the water bearing soil $a$ through the bottom of the shaft $c$, this water siping between the clay and the outer surface of the shaft and then working its way upwardly between the clay and the inner surface of the shaft. I remove this water by means of a pump $d$, an eduction pipe $e$ being inserted into the water (shown at $f$) and extending above the brink of the shaft hole, where the water is discharged. I have indicated another pipe $f^1$, which conveys operating steam to the pump $d$.

After the supplemental shaft $c$ has been sunk to the desired extent, and after the water at $f$ has been sufficiently removed, the main shaft $g$ is sunk through the bore of the supplemental shaft to the desired depth. An appreciable space intervenes between the outer surface of the inner shaft and the inner surface of the outer shaft for receiving or trapping any further water siping into the outer shaft, from which space the water may be removed by the pumping mechanism. The water allowed to remain in the space intervening between the two shafts is of such small quantity as to be substantially incapable of working its way between the outer surface of the inner shaft and the heavy soil $b$. The water in the water bearing soil $a$, by being trapped within the shaft $c$ and by being then removed in sufficient quantity from the shaft $c$, has no opportunity to find its way between the inner shaft and the soil surrounding the same, whereby water from the water bearing soil is incapable of finding access to the interior or main shaft. In this way the bore of the shaft proper, the inner shaft $g$, may be maintained sufficiently free of water to permit of the use of the shaft for the purpose for which it is intended. If it is intended to use this shaft in tunnel work, the shaft is sunk to the tunnel level, whereupon an opening $h$ may, if desired, be formed in the shaft, where the tunnel is to be located.

In order to increase the effectiveness of the trapping facilities that are afforded by the two shafts and the space intervening between the same, I desirably form a gutter in that portion of the soil *b* which intervenes between the two shafts, which gutter is provided with a rim or brink *i* adjacent to the inner or main shaft, so that the pump may readily keep the level of the water within the outer shaft below the level of the brink, thereby further insuring against the sipage of any water from the space between the shafts into the inner shaft. The shafts may be constructed of any suitable material and may be made of any suitable shape.

Shoes *k* may be provided, upon which the shafts may rest, as is well understood.

After the clay has been afforded sufficient opportunity to set about the main shaft or shaft proper, it will thereafter be impossible for the water to sipe between the clay and the main shaft even though the water rises within the supplemental shaft to a high point. Therefore, after the clay has set sufficiently about the main shaft, the pumping mechanism may be removed to be employed for the next shaft that is to be sunk.

The clay is a heavy soil and constitutes substantially a non-water bearing soil, whereas the sand is light soil and constitutes a water bearing soil through which the water may readily sipe.

There are occasions where it is desirable to sink shafts through a body of water into a non-water bearing soil. My invention is also well adapted for such a purpose, as may well be understood if the element marked *a* in the drawing is considered as water.

Having thus described my invention, I claim as new and desire to secure by Letters Patent the following:—

1. A supplemental shaft sunk to non-water bearing soil, a main shaft sunk through the bore of the supplemental shaft into the non-water bearing soil, water trapping space intervening between the two shafts, and a gutter in the non-water bearing soil having a brink adjacent to the outer surface of the main shaft to permit of the accumulation of a limited quantity of water.

2. A supplemental shaft sunk to non-water bearing soil, a main shaft sunk through the bore of the supplemental shaft into the non-water bearing soil, water trapping space intervening between the two shafts, mechanism for removing the water from the water trapping space, and a gutter in the non-water bearing soil having a brink adjacent to the outer surface of the main shaft to permit of the accumulation of a limited quantity of water.

In witness whereof, I hereunto subscribe my name this 25th day of November, A. D. 1907.

GEORGE R. MOORE.

Witnesses:
G. L. CRAGG,
L. G. STECH.